June 7, 1927.

R. RÜDENBERG

COOLING ELECTRIC MACHINERY

Filed Aug. 23, 1921

1,631,765

Inventor
Reinhold Rüdenberg
by Knight Bro
attorneys

Patented June 7, 1927.

1,631,765

UNITED STATES PATENT OFFICE.

REINHOLD RÜDENBERG, OF BERLIN-CHARLOTTENBURG, GERMANY, ASSIGNOR TO SIEMENS-SCHUCKERTWERKE GESELLSCHAFT MIT BESCHRANKTER HAFTUNG, OF SIEMENSSTADT, NEAR BERLIN, GERMANY, A CORPORATION OF GERMANY.

COOLING ELECTRIC MACHINERY.

Application filed August 23, 1921, Serial No. 494,546, and in Germany October 7, 1918.

(GRANTED UNDER THE PROVISIONS OF THE ACT OF MARCH 3, 1921, 41 STAT. L., 1313.)

My invention refers to the cooling of electric machines and its particular object is to improve the output of such machines by improving the means for cooling them.

Such machinery is constructed as a rule for a definite normal load or output and provided with a definite amount of positive (i. e. power driven) ventilation for cooling purposes, which must be of sufficient dimensions to suffice for the maximum continuous output required. This positive ventilation is usually embodied in the machine casing in the form of fan blades mounted in well known manner on the machine shaft.

Arrangements are also known for automatically controlling the supply of cooling air to a dynamo-electric machine by means of a thermostatic device affected by the temperature of the machine so as to give a supply appropriate to the needs of the latter.

In many cases however, the maximum load or output just referred to occurs (for example in central stations) only during a few hours of the day, and at that perhaps only during a few winter months, and therefore the machinery is underloaded or only imperfectly utilized at all other times.

This imperfect utilization of the machinery is obviated according to the invention, by running the machinery normally up to a load at which it reaches the permissible limit of temperature, the case of extreme output being provided for by a supplementary or extraneous ventilation added to the ordinary normal ventilation.

This extraneous ventilation is produced by external fans or ventilators and conveyed to the machine.

Thus as regards the utilization of the machines, similar conditions prevail in working as exist for example in case of steam turbines, which are fully loaded for economical utilization in the normal working, and to which fresh or live steam may be supplied for extreme outputs, thereby attaining a larger output, although with a lesser degree of efficiency.

Particularly favourable conditions are obtained for the mixed ventilation, which is employed for the extreme output, if the air pressure of the ordinary or main ventilator (when co-operating with the auxiliary ventilator) is kept constant between the normal output and the extreme output.

In order that the invention may be clearly understood and readily carried into effect reference will now be had by way of example to the accompanying diagrammatic drawings in which:—

Figure 1:
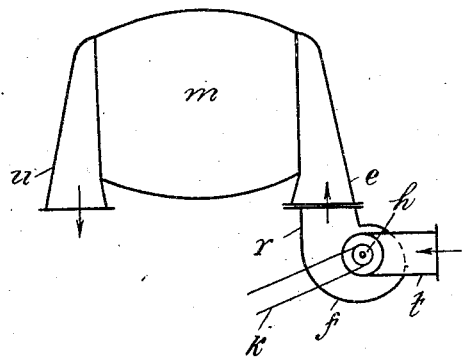
Figure 2:
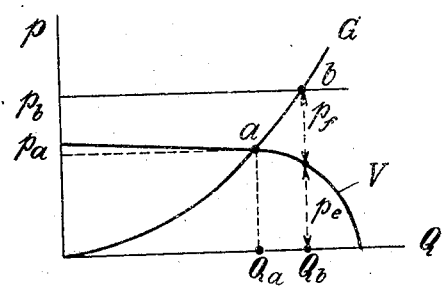

Fig. 1 illustrates an arrangement having an auxiliary additional air-supply in series with the ordinary supply, and Fig. 2 represents the characteristic curve diagram.

In Fig. 1, $m$ indicates a dynamo-electric machine, which is provided internally with a main fan or normal ventilating arrangement. This normal, internal ventilating arrangement may constitute any of the many well known types of ventilation for this class of machines, being operated by the machine itself, and the illustration thereof has been omitted in the drawings as fully within the knowledge of those skilled in the art. $e$ is the inlet and $u$ is the outlet for the cooling air. $f$ is an auxiliary fan or ventilator which has an inlet $t$ and an outlet $r$. This auxiliary fan may be driven by any suitable outside means known in the art and is, therefore, indicated in the drawings merely symbolically by a pulley $h$ and belt $k$.

This fan or ventilator is fitted on the air inlet $e$ of the dynamo electric machine.

If it be desired to work the auxiliary ventilator in series with the ordinary ventilator there is a danger that the latter may not be able to deal with the larger quantity of air necessary under the extreme output.

This danger can be avoided according to the invention by making the ordinary ventilator of a size which is adequate to pass the increased quantity of air through the machine. This will be the case if its characteristic curve, (that is to say the relationship of the air pressure to the quantity of air) is level or approximately so for the conditions under consideration.

The diagram in Figure 2 will serve to explain this. The curve G shows the necessary air-pressure $p$ to be applied in relation to the quantity of cooling air Q flowing through the generator, such pressure increasing approximately with the square in relation to the quantities of air.

The curve V is the characteristic for the main or normal ventilator; it shows the relationship between the pressure and the quantity of air which passes through the ventilator.

The point $a$ at which the two curves intersect, corresponds to the normal working point, at which the main or primary ventilator acting against the resistance of the airpath forces the requisite quantity $Q_a$ of air through the machine, viz. the quantity of air which exactly suffices for cooling the machine at normal load.

If it be desired to force a smaller quantity of air through the machine, the pressure (which corresponds to the difference of the curves V and G) must of course be reduced. On the other hand if, as in the present case, it be desired to force larger quantities (for example $Q_b$) through the machine, the auxiliary ventilator must deliver the air with the effective pressure $P_f$ corresponding to the difference G—V.

Now suppose that in order to keep the machine below the temperature limit in the case of extreme load or output, a quantity of cooling air $Q_b$ is necessary. In order to force this quantity through the machine, the pressure $p_b$ must be applied and this pressure can be made up of a pressure $p_e$ due to the primary ventilator and a pressure $p_f$ due to the auxiliary ventilator.

In order however that the arrangement may work economically, it is necessary that under these new conditions, the ordinary or primary ventilator should deliver its quantity of air approximately under its previous or maximum pressure, whilst the additional ventilation must make up the difference between $p_b$ and the pressure (which will not exceed $p_a$) yielded by the ordinary ventilator. This is obtained, with series connection of the ventilators, if $p_e$ $p_f$ cuts the characteristic V at or near its flat part or highest level.

For the additional extraneous ventilation according to the invention, it is necessary that the ordinary ventilator should be of such size, at the outset, that with the series connection described it can transmit a larger amount of air without too great a drop in pressure.

I would state that I am aware that arrangements for controlling the temperature of dynamo electric machinery either automatically or thermostatically have been proposed before, and I do not claim such per se.

I claim:—

In dynamo-electric machines in combination, a self-ventilator directly mounted on the shaft of the machine and adapted to furnish ventilation for normal load only, and a separately driven ventilator connected in series with said self-ventilator for supplying ventilation at excess machine load, said self-ventilator being of such construction that the pressure drop therein is approximately the same for the passage of the quantity of air required at normal load, as for the passage of the quantity of air required at overload.

In testimony whereof I affix my signature.

REINHOLD RÜDENBERG.